2,905,661
PRODUCTION OF POLYMERS FROM OLEFINES

Hubert Muehlbauer and Heinz Weber, Ludwigshafen (Rhine), Germany, assignors to Badische Anilin- & Soda-Fabrik Aktiengesellschaft, Ludwigshafen (Rhine), Germany No Drawing. Application October 17, 1956
Serial No. 616,367

Claims priority, application Germany October 20, 1955

16 Claims. (Cl. 260—93.7)

This invention relates to the production of polymers from olefines in the presence of organo aluminum compounds.

We have found that olefines, for example those having up to 8 carbon atoms and in particular with up to 4 carbon atoms in the molecule, as for example ethylene, propylene, butylene, isobutylene and mixtures thereof, can be polymerized in the presence of a catalyst of a halide of a metal of the 4th to 6th sub-groups of the periodic system of the elements, i.e., groups IV–A, V–A and VI–A, and a compound of the general formula XAlR(OR') and structural formula

under normal or slightly increased pressure to very high molecular weight film-forming products. In the general formula above, Al is aluminum, X is halogen, for example chlorine, bromine or iodine, O is oxygen and R and R' are identical or different alkyl, cycloalkyl or aryl radicals, if desired substituted for example by halogen. These compounds are obtained by reacting an aluminum halide with an ether in the presence of a reducing metal. It is preferable to use at least 2 mols of a reducing metal and about 3 mols of ether with reference to 1 mol of an aluminum halide in accordance with the process of the copending application Serial No. 616,368, filed on October 17, 1956, now Patent No. 2,867,643, by Guenther Hamprecht and Hubert Muehlbauer for Production of Alkyl Aluminum Halides. It is advantageous to use dialkyl or alkyl aryl ethers as the ether. All symmetrical and unsymmetrical dialkyl ethers can be used. The low molecular weight alkyl ethers, as for example dimethyl ether, methyl ethyl ether, methyl propyl ether, diethyl ether, di-normal-propyl ether and di-normal-butyl ether are especially suitable, i.e. especially ethers with alkyl groups which contain up to 4 carbon atoms, but those with alkyl groups of higher molecular weight are also suitable. Furthermore there may be used as alkyl aryl ethers, for example, anisol, para-methylanisol, phenyl ethyl ether or also halogenated alkyl aryl ethers, such as para-chloranisol. It is especially favorable to use further amounts of ether beyond the said 3 mols as solvent or diluent. In this case it is preferable to separate the reaction product from excess ether by distillation because ethers often disturb the polymerization of olefines.

Although it is preferable to use 2 mols of a reducing metal to 1 mol of aluminum halide, the relative amounts can be varied within wide limits, an excess of the metal having a specially favorable effect. The unused metal can find employment for further reactions. Depending on the boiling point of the ether used, the reaction is carried out under normal or increased pressure, preferably up to about 100 atmospheres. The reaction is preferably carried out at temperatures between about 80° and 220° C. When using lower aliphatic ethers quite special results are obtained by working at about 150° to 170° C. When using aromatic ethers, the reaction temperature is somewhat higher.

It is possible to carry out the reaction in the presence of indifferent organic anhydrous liquids as diluents. Among these are for example aromatic and also in particular saturated aliphatic or cycloaliphatic hydrocarbons or mixtures thereof. Frequently it is possible to start from the etherates of the aluminum halides and to react these with a reducing metal in the presence of either the same ether as that which has been used in the form of its complex compound with the aluminum halide, or preferably another dialkyl or alkyl aryl ether.

If the preparation of the compound XAlR(OR') has taken place in the absence of indifferent organic diluents, the reaction product, after removal of excess ether, is dissolved or suspended in an organic liquid which is suitable as a diluent in the polymerization of olefines. Such liquids are for example aromatic, aliphatic or cycloaliphatic hydrocarbons, if desired containing halogen, or mixtures thereof, as for example benzene, toluene, xylene, hexane, octane, gasoline or gasoline fractions and also cyclohexane. In other cases, the solution or suspension of the organo-aluminum compound in an indifferent diluent can be used directly. For this purpose there is added the halide of a metal of the 4th to 6th sub-groups, preferably in dissolved or suspended form. It is specially favorable to use about 0.2 to 15 mols, preferably 2 to 10 mols of the halide of a metal of the 4th to 6th sub-groups to 10 mols of the organo-aluminum compound of the formula XAlR(OR') but these relative proportions are not essential. Especially suitable halides of metals of the 4th to 6th sub-groups are for example titanium tetrachloride, titanium trichloride, zerconium tetrabromide, the halides of hafnium or thorium, vanadium tetrachloride, vanadium oxytrichloride, and also the halides of niobium and tantalum and finally chromyl chloride ($CrO_2Cl_2$), chromium-3-chloride and the halides of molybdenum or tungsten.

The mixture of organo-aluminum compound and the halide of a metal of the 4th to 6th sub-groups can advantageously be heated to temperatures up to about 100° C. prior to the beginning of the polymerization to improve its catalytic action. For example it is favorable to heat the mixture up to 80° C. for about 30 minutes, preferably while stirring.

Olefines are then allowed to act on the catalyst suspension thus obtained. Depending on the activity of the catalyst, the gaseous olefines can be led in at normal pressure or the polymerization is carried out under increased pressure. In general pressures up to about 30 atmospheres are sufficient, but in many cases it is preferable to raise the pressure up to about 70 atmospheres, if necessary even higher. The polymerization temperatures preferably lie between about −20° and +120° C., but the invention is not limited to this temperature range.

The polymers obtained, after removal of the diluent and any other volatile compounds, can be washed with solutions of acids in organic solvents, in particular alcohols or cyclic ethers, or in water, or extracted with boiling organic solvents. Solid film-forming high molecular weight polymers are obtained which can be worked up in the usual way for the working up of solid polyolefines. Foils, industrial fibers or threads and also molded articles with specially favorable properties can be prepared therefrom. Even when the ethylene is polymerized according to the proposed process under high pressure, in order to improve the space-time yields, the polymer obtained is not horny.

The following examples will further illustrate this invention but the invention is not restricted to these ex-

Example 1

4.2 parts of ethoxy ethyl aluminum chloride having the formula

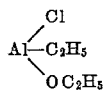

(prepared by reaction of 40 parts of anhydrous aluminum chloride, 20 parts of aluminum coarse powder and 150 parts of anhydrous diethyl ether at 170° C. with subsequent distillation of the excess ether) are dissolved in 280 parts of octane. Under an indifferent gas, 1 part of vanadium-4-chloride is added. The whole is stirred for 30 minutes at 40° C. and then into the resultant violet suspension, ethylene which has been purified from water and traces of oxygen is led in under normal pressure. The polymerization begins immediately. A pasty mass is formed which, after separation of the diluent, is washed with an aqueous methanolic solution of oxalic acid and then dried. 35 parts of pulverulent polyethylene are obtained. The intrinsic viscosity measured in tetraline (tetrahydronaphthalene) at 120° C. amounts to 7.9.

Example 2

A brown suspension is obtained from 0.43 part of titanium-4-chloride and 8.4 parts of ethoxy ethyl aluminum chloride by heating to 75° C. in 280 parts of octane. By leading ethylene into this suspension, a polyethylene is obtained with an intrinsic viscosity of 5.1 (measured as in Example 1).

Example 3

13.3 parts of ethoxy ethyl aluminum chloride and 12.1 parts of titanium tetrachloride are heated in 60 parts of pentane for half an hour at 40° C. A brown catalyst suspension is obtained which is introduced into an autoclave while excluding atmospheric oxygen. 450 parts of butane are then forced in and then purified ethylene up to a pressure of 15 atmospheres. If the polymerization does not begin immediately, it is slowly heated to 50° C. This temperature is maintained during the reaction and when the pressure falls it is restored to 15 atmospheres by forcing in further ethylene. After 20 hours there are obtained 400 parts of polytethylene which is boiled up with aqueous methanol and then dried. The loose white powder melts at 124° to 127° C. in the polarization microscope. This intrinsic viscosity is 1.9.

Example 4

13.3 parts of ethoxy ethyl aluminum chloride and 12.3 parts of vanadium tetrachloride are suspended in 560 parts of octane. The suspension is introduced while excluding air into an autoclave, 175 parts of liquid propylene are forced in and the whole heated to 100° C. while shaking. After about 10 hours, the pressure, which at first was between 5 and 10 atmospheres, has fallen to 1 atmosphere. 730 parts of a rubberlike polymer are obtained which is washed several times, while stirring vigorously, with a mixture of methanol, water and hydrochloric acid and then with methanol and water. After filtration by suction and drying, a pale elastic polypropylene is obtained. The product melts between 153° and 158° C., observed in the polarization microscope. The intrinsic viscosity amounts to 1.95.

Example 5

Propylene purified from water and oxygen is led into a suspension of 13.3 parts of ethoxy ethyl aluminum chloride and 12.3 parts of vanadium tetrachloride in 280 parts of octane. The temperature thereby rises to 30° C. A gelatinous mass is obtained which is purified as described in Example 4. A polypropylene of the melting range 156° to 165° C. is obtained with an intrinsic viscosity of 2.2.

Example 6

10.9 parts of methoxy propyl aluminum chloride having the formula

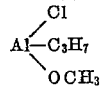

are dissolved in 60 parts of pentane, then 15.2 parts of titanium tetrachloride are added and the whole stirred under reflux for 30 minutes. The resultant catalyst suspension is introduced into an autoclave and then ethylene is forced in up to a pressure of 60 atmospheres. The temperature rises within a few minutes to 50° to 60° C. and is kept constant for another 3 hours by heating. After this time, all the ethylene has been polymerized. After washing with aqueous methanol while hot and drying, 160 parts of a pale powdery polymer are obtained. It melts at 122° to 128° C. and the intrinsic viscosity amounts to 0.8.

Example 7

5.5 parts of ethoxy ethyl aluminum bromide, 5.2 parts of titanium tetrachloride and 40 parts of octane are introduced into a pressure vessel and 40 parts of ethylene are forced in under 60 atmospheres pressure and heated for an hour at 60° C., the pressure thereby falling to a few atmospheres. After washing and drying, 32 parts of powdery polyethylene of the melting point 121° to 128° C. are obtained. The intrinsic viscosity amounts to 0.55.

Example 8

Ethylene is led for an hour into a suspension obtained from 140 parts of octane, 8.2 parts of ethoxy ethyl aluminum bromide and 5.8 parts of vanadium tetrachloride. The temperature is kept below 50° C. by external cooling. The polyethylene formed has a melting point of 124° to 128° C. The intrinsic viscosity amounts to 4.13.

Example 9

A catalyst is prepared from 5.5 parts of ethoxy ethyl aluminum bromide and 5.8 parts of vanadium tetrachloride in 40 parts of octane, the mixture is introduced into an autoclave and 50 parts of liquid propylene are forced in. In is heated to 80° C. and this temperature is held for about 6 hours. The pressure, amounting on an average to 15 atmospheres, has then fallen to 1 to 2 atmospheres. The polypropylene (34 parts) obtained is washed as described in Example 4. It melts at 142° to 148° C.; the intrinsic viscosity amounts to 2.05.

Example 10

5.5 parts of ethoxy ethyl aluminum bromide are ground with 4.8 parts of chromium-3-chloride under 40 parts of octane with the aid of a high speed stirrer. The catalyst obtained is introduced into an autoclave and ethylene is forced in up to a pressure of 60 atmospheres. It is heated to 100° C. and after 12 hours there is obtained a reddish colored polymer. It is washed while hot with a solution of 5 percent oxalic acid which contains in 100 parts 1 part of saturated chromium-2-chloride solution, with the addition of a wetting agent. The polyethylene obtained melts at 128° to 132° C. and the intrinsic viscosity amounts to 5.87.

Example 11

4.9 parts of propoxy propyl aluminum chloride having the formula

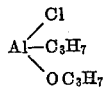

are introduced together with 5.2 parts of titanium tetrachloride and 40 parts of octane into an autoclave and ethylene is forced in up to a pressure of 50 atmospheres. After about 10 hours, the pressure has fallen to a few atmospheres. The resultant polyethylene melts at 122° to 125° C.; the intrinsic viscosity amounts to 0.83.

*Example 12*

5.8 parts of vanadium tetrachloride are added while cooling and stirring to a solution of 5.5 parts of ethoxy ethyl aluminum bromide in 70 parts of octane. The suspension obtained is transferred to an autoclave and 60 parts of liquid isobutylene are forced in. The polymerization begins immediately. It is heated for 5 hours at about 40° C. After washing with methanol and water, 55 parts of a semisolid, sticky polymer are obtained. The intrinsic viscosity amounts to 0.2.

We claim:

1. A process for polymerizing an olefine containing from 2 to 4 carbon atoms which comprises contacting said olefine with a polymerization catalyst of a metal halide selected from the group consisting of the chlorides and bromides of the metals of groups IV–A, V–A and VI–A of the periodic system of the elements, and an organo-aluminum compound of the formula $$\text{Al}\!\!\begin{array}{c}\diagup X \\ -R \\ \diagdown OR'\end{array}$$

wherein Al is aluminum, X is a halogen, O is oxygen, R is a lower alkyl radical, and R' is a radical selected from the group consisting of lower alkyl, lower alkyl-substituted phenyl, halophenyl, and phenyl radicals, the molar ratio of said metal halide to said organo-aluminum compound being 0.2–15:10.

2. A process as claimed in claim 1 wherein the organo-aluminum compound and the metal halide are heated to temperatures up to about 100° C. prior to the beginning of the polymerization.

3. A process as claimed in claim 1 wherein an alkoxy alkyl aluminum halide is used in which the organic radicals R and R' each contain up to 4 carbon atoms.

4. A process as claimed in claim 1 wherein the metal halide is titanium tetrachloride.

5. A process as claimed in claim 1 wherein the metal halide is vanadium tetrachloride.

6. A process as claimed in claim 1 wherein the metal halide is chrominum trichloride.

7. A process as claimed in claim 1 wherein the polymerization is carried out under normal pressure.

8. A process as claimed in claim 1 wherein the polymerization is carried out at a pressure up to about 70 atmospheres.

9. A process as claimed in claim 1 wherein the polymerization is carried out at temperatures between about −20° and +120° C.

10. A process as claimed in claim 1 wherein the polymerization is carried out in the presence of an inert diluent.

11. A process for the production of polyethylene which comprises contacting ethylene with a polymerization cataylst of, in relative proportions, 0.2–15 mols of titanium tetrachloride and 10 mols of a lower alkoxy lower alkyl aluminum halide.

12. A process for the production of polyethylene which comprises contacting ethylene with a polymerization catalyst of, in relative proportions, 0.2–15 mols of vanadium tetrachloride and 10 mols of a lower alkoxy lower alkyl aluminum halide.

13. A process for the production of polyethylene which comprises contacting ethylene with a polymerization catalyst of, in relative proportions, 2–10 mols of titanium tetrachloride and 10 mols of ethoxy ethyl aluminum chloride.

14. A process for the production of polyethylene which comprises contacting ethylene with a polymerization catalyst of, in relative proportions, 2–10 mols of vanadium tetrachloride and 10 mols of ethoxy ethyl aluminum chloride.

15. A process for the production of polypropylene which comprises contacting propylene with a polymerization catalyst of, in relative proportions, 0.2–15 mols of titanium tetrachloride and 10 mols of a lower alkoxy lower alkyl aluminum halide.

16. A process for the production of polypropylene which comprises contacting propylene with a polymerization catalyst of, in relative proportions, 0.2–15 mols of vanadium tetrachloride and 10 mols of a lower alkoxy lower alkyl aluminum halide.

References Cited in the file of this patent

UNITED STATES PATENTS

| 2,559,062 | Dornte | July 3, 1951 |
| 2,721,189 | Anderson et al. | Oct. 18, 1951 |

FOREIGN PATENTS

| 533,362 | Belgium | May 16, 1955 |
| 538,762 | Belgium | Dec. 6, 1955 |
| 534,792 | Belgium | Jan. 31, 1955 |